Jan. 12, 1932.  J. A. GOODNER  1,840,711
PUMP
Filed May 29, 1930   2 Sheets-Sheet 1
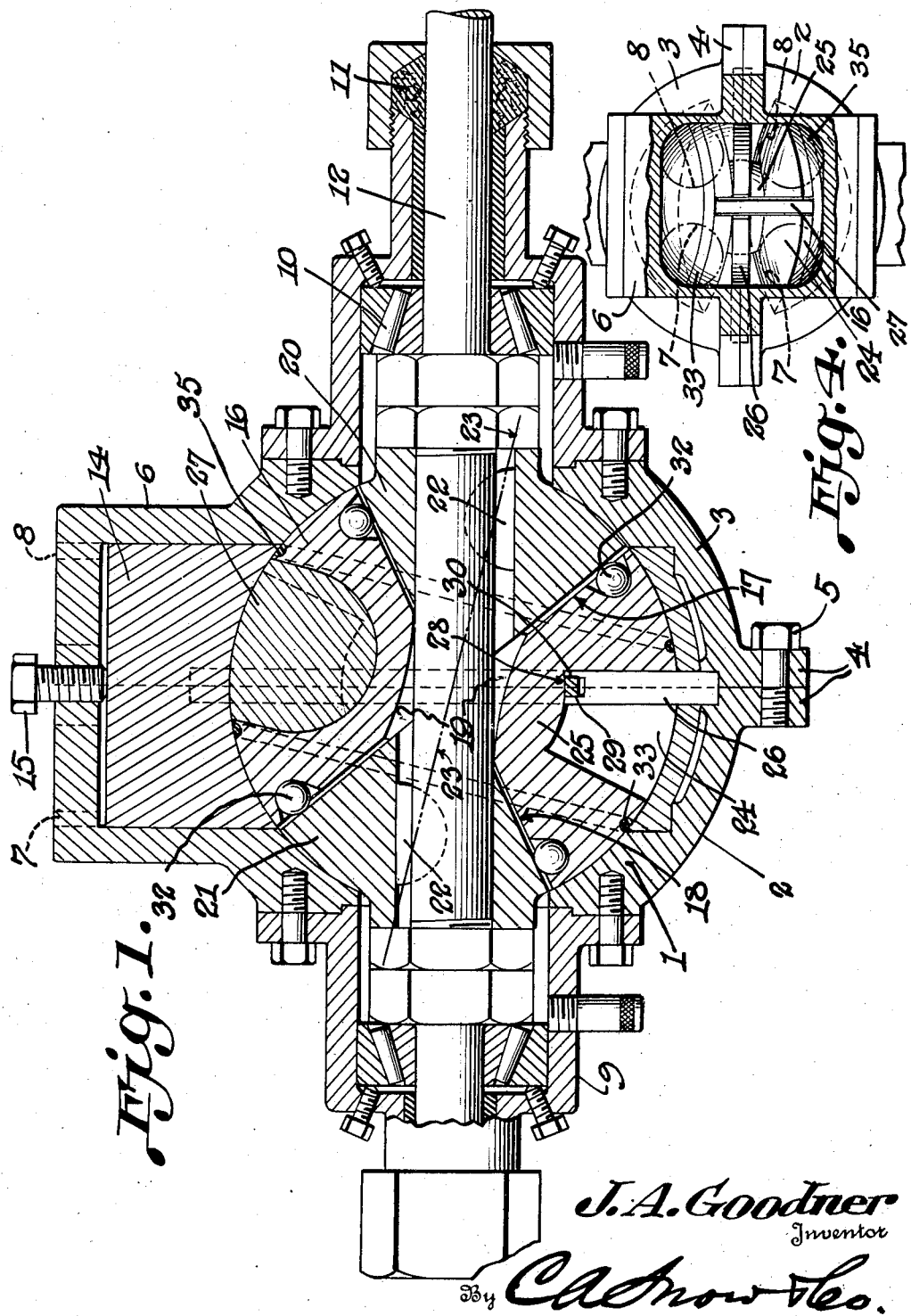

Jan. 12, 1932.　　　J. A. GOODNER　　　1,840,711
PUMP
Filed May 29, 1930　　2 Sheets-Sheet 2
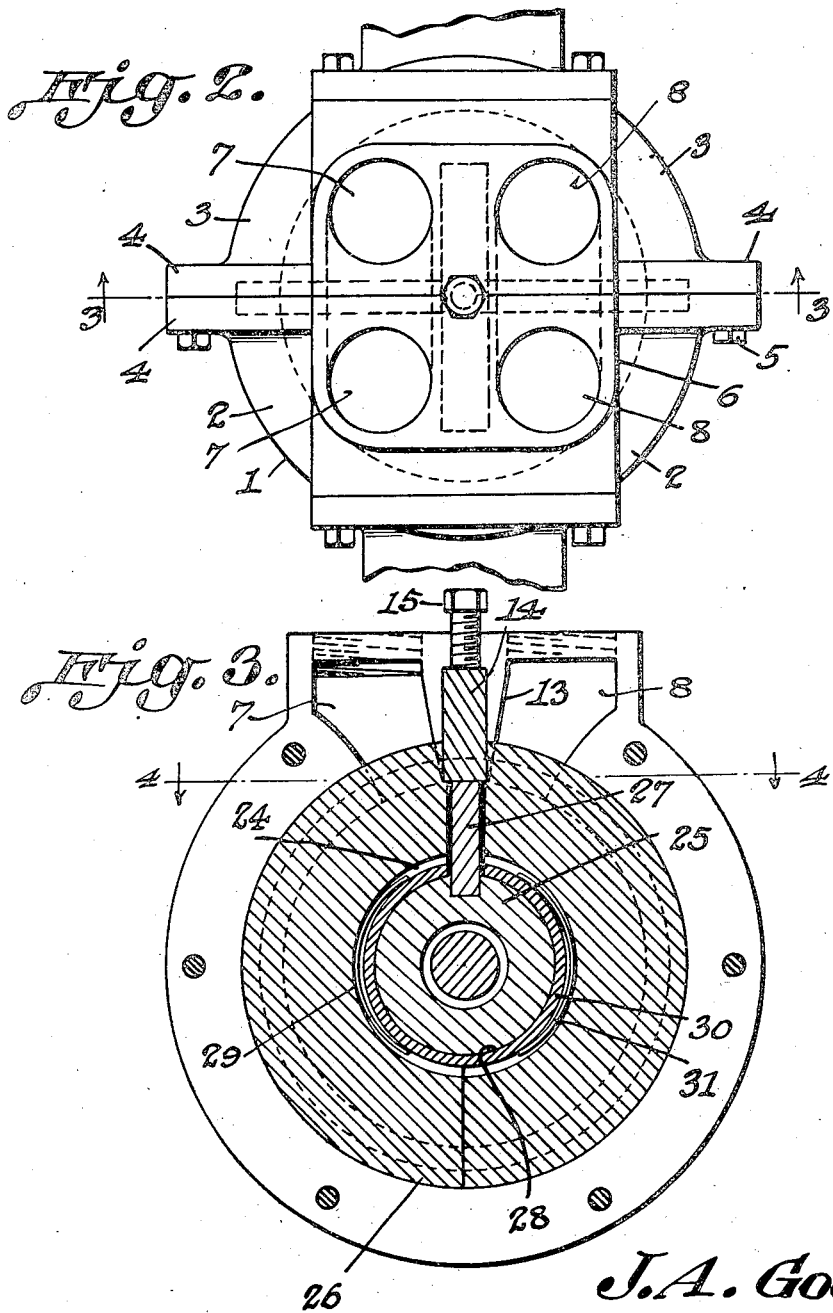
J. A. Goodner
Inventor Patented Jan. 12, 1932

1,840,711

UNITED STATES PATENT OFFICE

JAMES ANDREW GOODNER, OF ROCKY FORD, COLORADO

PUMP

Application filed May 29, 1930. Serial No. 457,447.

This invention relates to a force pump, one of the objects being to provide a rotatable forcing element co-operating with a piston of novel construction whereby during the actuation of the pump, the shaft and other working parts will be relieved from excessive pressures which might otherwise distort the mechanism.

The invention is designed more especially as an improvement on my Patent 1,434,741, and among its other advantages is the simplification of structure, ease of assembly and separation, and increase in efficiency.

With the foregoing and other objects in view which will appear as the description proceeds, the invention resides in the combination and arrangement of parts and in the details of construction hereinafter described and claimed, it being understood that changes in the precise embodiment of the invention may be made within the scope of what is claimed without departing from the spirit of the invention.

In the accompanying drawings the preferred form of the invention has been shown.

In said drawings

Figure 1 is a central vertical section, the drive shaft being shown in elevation.

Figure 2 is a plan view, parts being broken away.

Figure 3 is a section on line 3—3, Figure 2.

Figure 4 is a section on a reduced scale taken on the line 4—4, Figure 3.

Referring to the figures by characters of reference, 1 designates a substantially globular casing formed of separate sections 2 and 3 provided with flanges 4, whereby they can be held together detachably by means of bolts 5. A housing 6 is formed by extensions of the sections 2 and 3, and is provided with ports 7 and 8.

Bonnets 9 are secured to the casing 1 at diametrically opposed points, and carry bearings 10 and packings 11 through which is extended a drive shaft 12.

The housing 6 is provided with a partition 13 between the ports 7 and 8 and in this partition is a take-up plate 14 adjustable by a screw 15 and adapted to engage the outer surface of a wabble-ball 16. This ball has diametrically opposed conical recesses 17 and 18, the apices of which meet at the center of the ball while the central axes of the recesses coincide. An opening 19 connects the inner ends of the recesses and is flared towards its ends.

The shaft 12 extends through the conical recesses and through opening 19 and has opposed cones 20 and 21 keyed thereon as at 22. The longitudinal axes of the cones coincide as indicated by the dotted line 23, and are obliquely disposed relative to the axis of rotation of shaft 12.

The ball 16 is provided midway between its recesses 17 and 18 with an annular groove 24, the walls of which diverge outwardly from a rounded core 25 formed by the center of the ball.

A stator in the form of a split disk 26, is clamped at its margin between the sections 2 and 3 and is contained in the groove 24. The sections of the disk bear at one end against an abutment 27 carried by the ball and intersecting groove 24.

A central opening 28 is formed in the disk and the core 25 of the ball rocks therein. In the wall of this opening is a groove 29 holding a split sealing ring 30. Springs 31 seated in groove 29 act to hold the sealing ring in intimate contact with the core 25.

Balls 32 are carried by the wabble-ball 16 and provide bearings for the cones 20 and 21. Wear rings 33 are seated in the sections 2 and 3 for engagement by ball 16.

The walls of groove 24 are so positioned relative to the faces of disk 26 that when the ball is given a wabble motion the walls will have a moving contact with the upper and lower faces of the disk at diametrically opposed points respectively. This wabble motion will be imparted by the obliquely disposed cones rotating with shaft 12. The upper wall of the groove in the ball will trap water or other liquid received from port 7 at one side of partition 13 and abutment 27, forcing it around the shaft and along one face of the disk 26 until the other port 8 is reached. The other wall will similarly trap fluid on the other face of the disk. Thus during one rotation of the shaft, there will be two expulsions of fluid by the co-operating surfaces of the disk 26 and groove 24. It will be noted that port 7 can supply fluid to both sides of disk 26 while port 8 can receive fluid from both sides thereof. The ball 16 can be provided with packing rings as shown, for example, at 34.

What is claimed is:

1. A pump including a casing, a stator therein, a wabble ball having an annular groove in which the stator is seated, an inlet port and an outlet port opening into the groove at each side of the stator, an abutment between the inlet and outlet ports, a shaft rotatable with the ball, and means carried by the shaft for imparting a wabble motion to the ball relative to shaft and stator, said means including opposed cones rotatable with the shaft and having alining axes obliquely disposed relative to the shaft, there being recesses in the ball providing seats for the cones.

2. A pump including a casing, a stator therein, a wabble ball having an annular groove in which the stator is seated, an inlet port and an outlet port opening into the groove at each side of the stator, an abutment between the inlet and outlet ports, a shaft extending through the ball, and means carried by the shaft for imparting a wabble motion to the ball relative to shaft and stator, said means including opposed cones rotatable with the shaft and having alining axes obliquely disposed relative to the shaft, there being recesses in the ball providing seats for the cones, and anti-friction bearings between the cones and their seats.

3. A pump including a casing, opposed cones mounted for rotation in the casing about an axis oblique to the axis of the cones, a wabble ball in the casing having seats for the cones and an annular groove, a stator extending around the ball and seated in the groove, an inlet port and an outlet port opening into the casing at each side of the stator, and an abutment in the groove between the inlet and outlet ports.

In testimony that I claim the foregoing as my own, I have hereto affixed my signature.

JAMES ANDREW GOODNER.